United States Patent [19]

Kleinschnitz

[11] Patent Number: 5,479,581
[45] Date of Patent: Dec. 26, 1995

[54] MULTIPLE LIBRARY MEDIA EXCHANGE SYSTEM AND METHOD

[75] Inventor: Donald Kleinschnitz, Louisville, Colo.

[73] Assignee: Storage Technology Corporation, Louisville, Colo.

[21] Appl. No.: 176,457

[22] Filed: Dec. 30, 1993

[51] Int. Cl.⁶ .................... G01B 11/14; G01B 15/00; G05B 19/42
[52] U.S. Cl. .................. 395/82; 395/80; 395/84; 360/92; 360/93; 414/277; 364/478
[58] Field of Search .................. 395/82, 80, 84; 364/478; 901/2; 414/277; 360/92, 93

[56] References Cited

U.S. PATENT DOCUMENTS

| | | | |
|---|---|---|---|
| 4,697,979 | 10/1987 | Nakashima et al. | 395/82 |
| 4,864,511 | 9/1989 | Moy | 360/92 |
| 4,908,777 | 3/1990 | Wolfe | 395/89 |
| 4,928,245 | 5/1990 | Moy et al. | 364/478 |
| 4,932,826 | 6/1990 | Moy et al. | 414/277 |
| 4,945,429 | 7/1990 | Munro et al. | 364/478 |
| 5,164,909 | 11/1992 | Leonhardt et al. | 364/478 |
| 5,253,911 | 10/1993 | Egan et al. | 901/32 |
| 5,301,261 | 4/1994 | Poole et al. | 395/82 |
| 5,303,034 | 4/1994 | Carmichael et al. | 356/375 |
| 5,336,030 | 8/1994 | Ostwald et al. | 414/277 |

*Primary Examiner*—George B. Davis
*Attorney, Agent, or Firm*—Sterne, Kessler, Goldstein & Fox

[57] ABSTRACT

A media exchange system uses a robot arm assembly to allow tape cartridges and other storage media to be shared among multiple, individual, media storage libraries. One or more media storage libraries are provided for data storage. Each media storage library has its own internal media storage facility that can be accessed at a relatively quick speed. If required, the robot arm assembly can be used to transfer media from one media storage library to another. Additional media storage cells are provided external to the individual media storage libraries. These provide additional tape storage.

8 Claims, 11 Drawing Sheets

MULTIPLE LIBRARY MEDIA EXCHANGE SYSTEM AND METHOD

BACKGROUND OF THE INVENTION

1. Field of the Invention

The present invention relates generally to media storage, and more particularly to a media storage system that allows media to be stored in and transferred among a plurality of media storage libraries.

2. Related Art

The advent of low cost, high powered computing systems has led to an expansion of their application in business and industry. As computing systems have become heavily relied upon to handle all facets of business and industry, the data storage requirements of these systems have grown dramatically. In an effort to contain data storage costs, system developers began to provide low cost data storage alternatives.

One early alternative was the paper tape storage medium. In this alternative, holes were punched into a paper tape, and the tape read by an optical reader. This eventually evolved into the use of magnetic tapes to store large amounts of data. Early magnetic tape storage systems required an operator to mount tapes onto a tape drive so the computer could access the tape.

Automated magnetic tape storage libraries were introduced to provide rapid access to a large number of magnetic tapes. Such systems utilize a robotic arm to retrieve a magnetic tape (housed in a cartridge) and mount the tape in a tape drive. One such automated storage system is the ACS4400 library system available from Storage Technology Corporation in Louisville, Colo., 80028.

These automated media storage libraries are available in a number of different configurations to meet a variety of storage needs. However, in many situations, the ability to reconfigure or expand the library to meet the dynamics of data storage demands is limited.

Additionally, as the storage volume requirements increase, the size of the storage system increases as well. Because of the large size of these automated systems, the robotic arm may be required to travel a relatively large distance to retrieve a cartridge to be loaded into a tape drive. This latency results in a longer average data access time and thus hinders system performance.

A further disadvantage of these automated systems is that a single robotic arm means that only one tape can be manipulated (mounted or unmounted) at a given time. Although some systems now have double-ended robotic arms, the ability to do cartridge retrieval operations in parallel is still somewhat limited.

SUMMARY OF THE INVENTION

The present invention is directed toward a media exchange system that allows media to be exchanged between one or more media storage libraries and a plurality of internal storage cells. The system allows individual media storage libraries to access media stored in other libraries.

One or more media storage libraries are arranged in a circular fashion around a robot arm assembly. The robot arm assembly is capable of accessing media stored in any one of the surrounding media storage libraries, and transferring that media to one of the other media storage libraries. Additional storage is provided via storage cells positioned along the periphery of the media exchange system and along an inner circle that is concentric with the periphery.

Each individual media storage library can be an independent, fully operational library supporting one or more processing facilities. Each individual media storage library has its own cache of cartridges that are used for normal operations. On these cached cartridges, data that are used frequently by that library's processing system are stored. Thus, each processing system has rapid access to the data it uses most frequently.

Through the use of the robot arm assembly, if a first processing system requires data stored in the library of a second processing system, the cartridge containing that data can be transferred from the second media storage library to the first media storage library. More specifically, the robot arm assembly retrieves the desired cartridge from one media storage library and transfers that cartridge to another media storage library that currently needs the data contained thereon. In this manner, that data in one library's cache can be accessed by every other library within the media exchange system.

As mentioned, additional storage cells can be provided in concentric circles within the media exchange system. Although these are external to the individual libraries, cartridges stored here can be provided to any of the individual libraries when required through the use of the robot arm assembly. Nominally, however, tapes stored in these cells are not accessed as quickly as those stored in a library's cache.

One advantage of the present invention is that each media storage library can provide relatively rapid access to the cartridges stored in its own cache. It is in this cache that the frequently accessed cartridges are stored. Thus, for frequently used data, relatively rapid access times can be achieved. This provides an increase in system performance.

A further advantage is that each media storage library is not limited to the data stored on cartridges within its own cache. A processing system having access to a single media storage library is provided with rapid access to the data contained within that library and further provided with access to additional data stored in other libraries. Thus, each processing system that accesses a single media storage library actually has access to a much larger virtual library.

A further advantage of the invention is that a tremendous amount of system flexibility is provided. The media exchange system can be implemented with any number of individual media storage libraries and with additional storage cells independent of those libraries. Thus, as the data processing and storage demands of a particular facility evolve, the configuration of the media exchange system can change as well. Additional media storage libraries can be added to the system when new data storage and access requirements arise.

Another flexibility-related advantage is that one or more independent or related processing systems can be grouped together to share one or more media storage libraries. In other words, the media exchange system is not limited to serving a single processing system.

Further, each of the small media storage libraries can be dedicated to a different processing system. This allows system configuration flexibility. Additionally, two or more small libraries can be grouped under the control of a single processing system, depending on system requirements.

Another advantage is that data retrieval and storage operations can be performed in parallel. Each media storage library can access cartridges within its cache while other media storage libraries are doing the same. Therefore, multiple tape drive operations can occur simultaneously. Additionally, the robot arm assembly can be transferring cartridges between storage locations in parallel with data retrieval and storage operations occurring within the media storage libraries.

A further advantage is that system redundancy can be provided. Each media storage library can have a "mirror" library as a data storage backup. Thus, in the event one library is down for maintenance, operation can continue with the mirror system until the first system is repaired.

Further features and advantages of the present invention, as well as the structure and operation of various embodiments of the present invention, are described in detail below with reference to the accompanying drawings.

BRIEF DESCRIPTION OF THE DRAWINGS

The present invention is described herein with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

Table of Contents

1. Overview and Discussion of the Invention
2. Media Exchange System
    2.1 Media Storage Library
    2.2 Robotic Assembly
        2.2.1 Robotic Arm
        2.2.2 Robotic Hand
        2.2.3 Vision System
3. Representative Architectures
4. Conclusion

1. Overview and Discussion of the Invention

The present invention is directed toward a media exchange system that allows storage media, such as magnetic tape cartridges, to be exchanged between numerous media storage libraries. A robotic arm is controlled to access tapes from one library and transfer these tapes to another library, an independent tape drive, and/or internal storage. As a result, each library can function independently of the other libraries, yet data can still be shared among the libraries. That is, each library can have its own CPU control, tape drives, and stored tape inventory, yet each library can also access tapes stored in another independent library or stored within the media exchange system.

This media exchange system allows tape storage library systems to expand as data storage demands increase. A processing facility could begin operations using a single media storage library. This media storage library would have its own tape drives and tape storage area. When a tape is to be accessed, a robotic arm (or similar mechanism) within the media storage library loads the tape into one of the internal drives. As the capacity of the processing facility is augmented to handle more data, one or more additional media storage libraries can be added to meet the growing demand.

The addition of independent media storage libraries, coupled together via the media exchange system, allows each individual media storage library to maintain its independence while also allowing data storage media to be shared among the several media storage libraries. This provides the processing equipment with the advantages of a smaller (faster access) library, as well as the greater storage volume of a larger library. These advantages are especially apparent where, for example, several separate processors are operating, and each processor has its own dedicated library. In this representative scenario, media (e.g., tape cartridges) are stored in the library dedicated to the processor that is expected to use that data most frequently. Therefore, each processor has rapid access to frequently-accessed data. Additionally, these cartridges can be shared by other CPUs via the media exchange system, albeit not as quickly.

Figure 1:
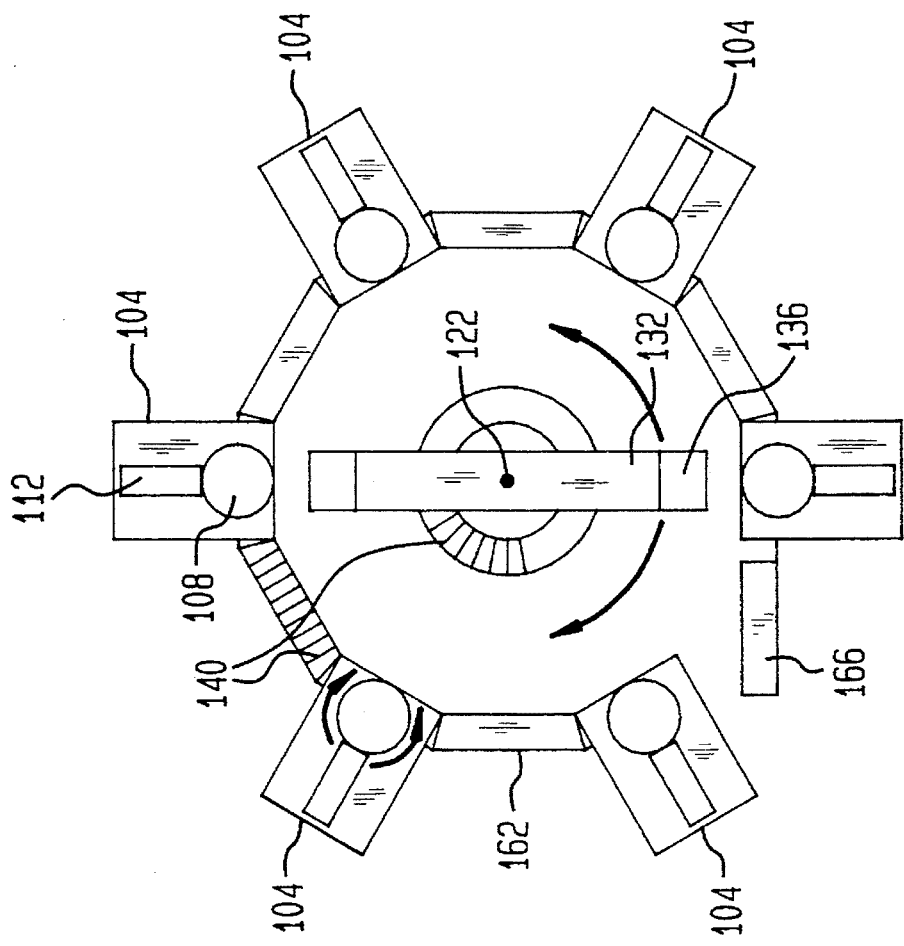
FIG. 1 is a diagram illustrating a media exchange system according to one embodiment of the present invention.

FIG. 1 is a diagram illustrating one embodiment of the media exchange system. Referring now to FIG. 1, media exchange system 100 is now generally described. In this document, the media handled by media exchange system 100 is at times referred to herein as one or more tape cartridges. It would be apparent to a person skilled in the relevant art how media exchange system 100 could be implemented to handle any of a number of different types of media including optical tapes, magnetic tapes, disks, and the like.

Media exchange system 100 includes a transport arm 132 pivotally mounted at central point 122. Transport arm 132 includes a robotic hand 136 at one or both ends. Media exchange system 100 also includes tape cartridge storage cells 140. In one embodiment, media exchange system 100 includes two concentrically-arranged arrays of storage cells 140 Cells 140 provide additional media storage.

In one embodiment, several media storage libraries 104 are configured about a central point 122 in media exchange system 100. Although six are illustrated in FIG. 1, any number of media storage libraries 104 can be included depending on the data storage requirements, the size of libraries 104, and the available space for media exchange system 100. Each media storage library 104 includes its own media storage area 108 and one or more tape drives 112. Media storage area 108 includes cells for storing individual data storage media units (e.g., individual cartridges). An example of media storage library 104 is described in Section 2.1 of this document.

In a preferred embodiment, walls 162 are provided to fully enclose transport arm 132. In this embodiment, a wall 162 is provided at each location where there is no media storage library 104. One wall 162 can be hinged or have an opening to provide an access port 166.

Each media storage library 104 can respond to an independent processor and operate independently of other libraries 104. Alternatively, two or more libraries 104 can be shared by a single processor.

Figure 2:
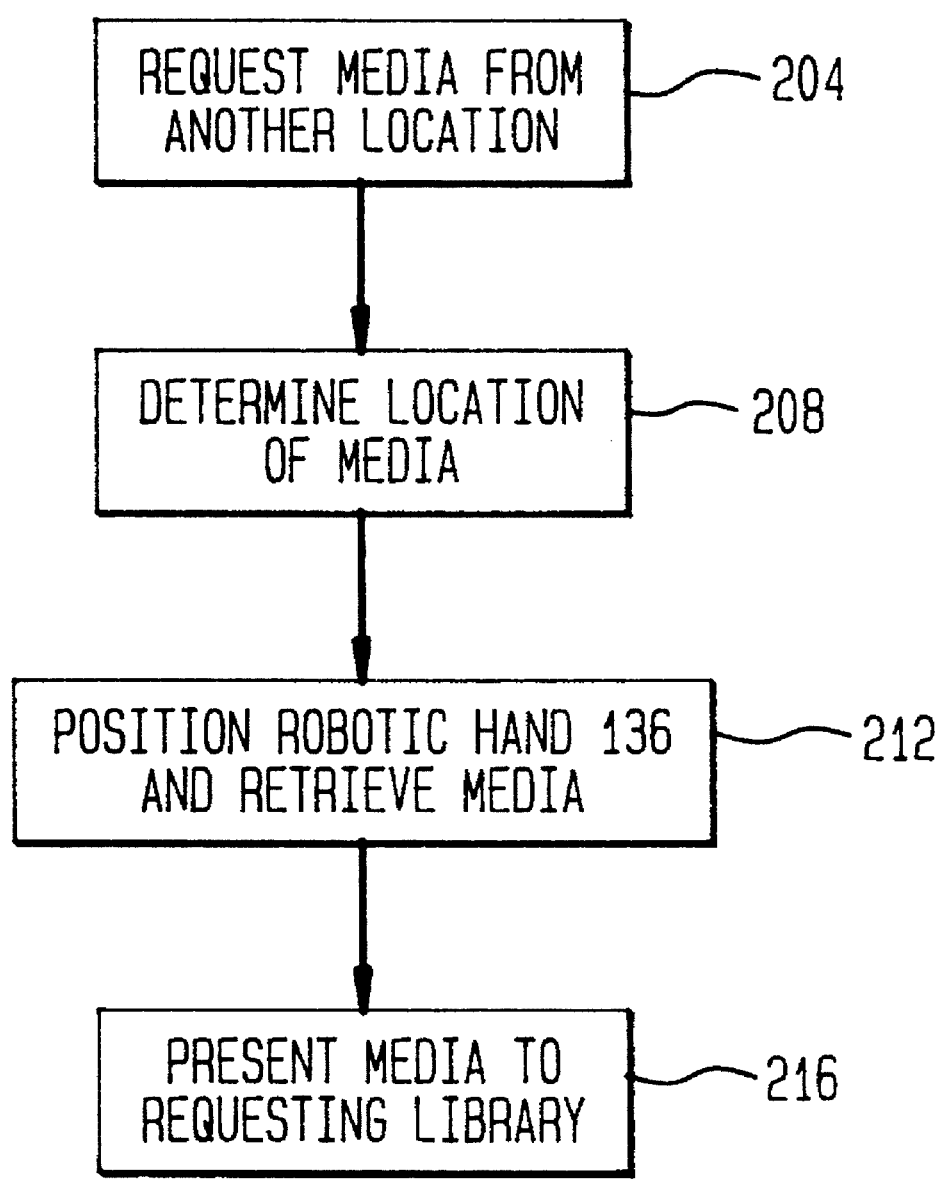
FIG. 2 is an operational flow diagram illustrating a high level operation of the media exchange system.

FIG. 2 is a flow diagram illustrating the basic operation of media exchange system 100. Referring now to FIGS. 1 and 2, in operation, a typical media storage library 104 has the media that it frequently accesses stored in its own media storage area 108. Thus, library 104 can retrieve frequently-used cartridges immediately. If, however, one media storage library 104 requires a tape cartridge stored in another media storage library 104 or in storage cells 140, it sends a request to media exchange system 100 to retrieve that cartridge. This occurs in a step 204.

In response, media exchange system 100 determines the location of the requested cartridge in a step 208. Media exchange system 100 positions transport arm 132 so that robotic hand 136 is adjacent to the desired cartridge. This occurs in a step 208 and uses robotic hand 136 to retrieve (e.g., reach out and grasp) the cartridge from its storage location. This occurs in a step 212.

In a step 216, transport arm 132 positions robotic hand 136 adjacent to the requesting media storage library 104 and robotic hand 136 presents the tape to the media storage library 104 that requested the tape.

2. Media Exchange System 2.1 Media Storage Library

In a preferred embodiment, the media exchange system is interfaced to a carousel type media storage library. However, it would be apparent to a person skilled in the relevant art how to implement the media exchange system with any of a number of other types of media storage libraries 104.

The carousel library is advantageous because it provides relatively rapid access to a number of high-density tape cartridges in a rotating carousel. One advantage of the carousel library is that its tape drives are configured such that they are aligned with the carousel. As a result, the robotic arm is only required to move in two dimensions. Vertical motion positions the arm in line with a tape in the carousel or in line with a tape drive. Horizontal front-to-back motion allows the arm to retrieve (or place) a tape from (or into) the tape drive or the carousel. No side-to-side motion is required. This simplifies arm alignment and speeds arm placement.

An additional advantage of the carousel library is its relatively small size. This advantage provides a low-cost solution suitable for a wide range of applications. In some applications, the small size of the library 104, by itself, could be a detriment where storage requirements already exceed or are expected to outgrow the size of media storage library 104. In these applications, it would be advantageous to interface two or more media storage libraries 104 using media exchange system 100.

Figure 6:
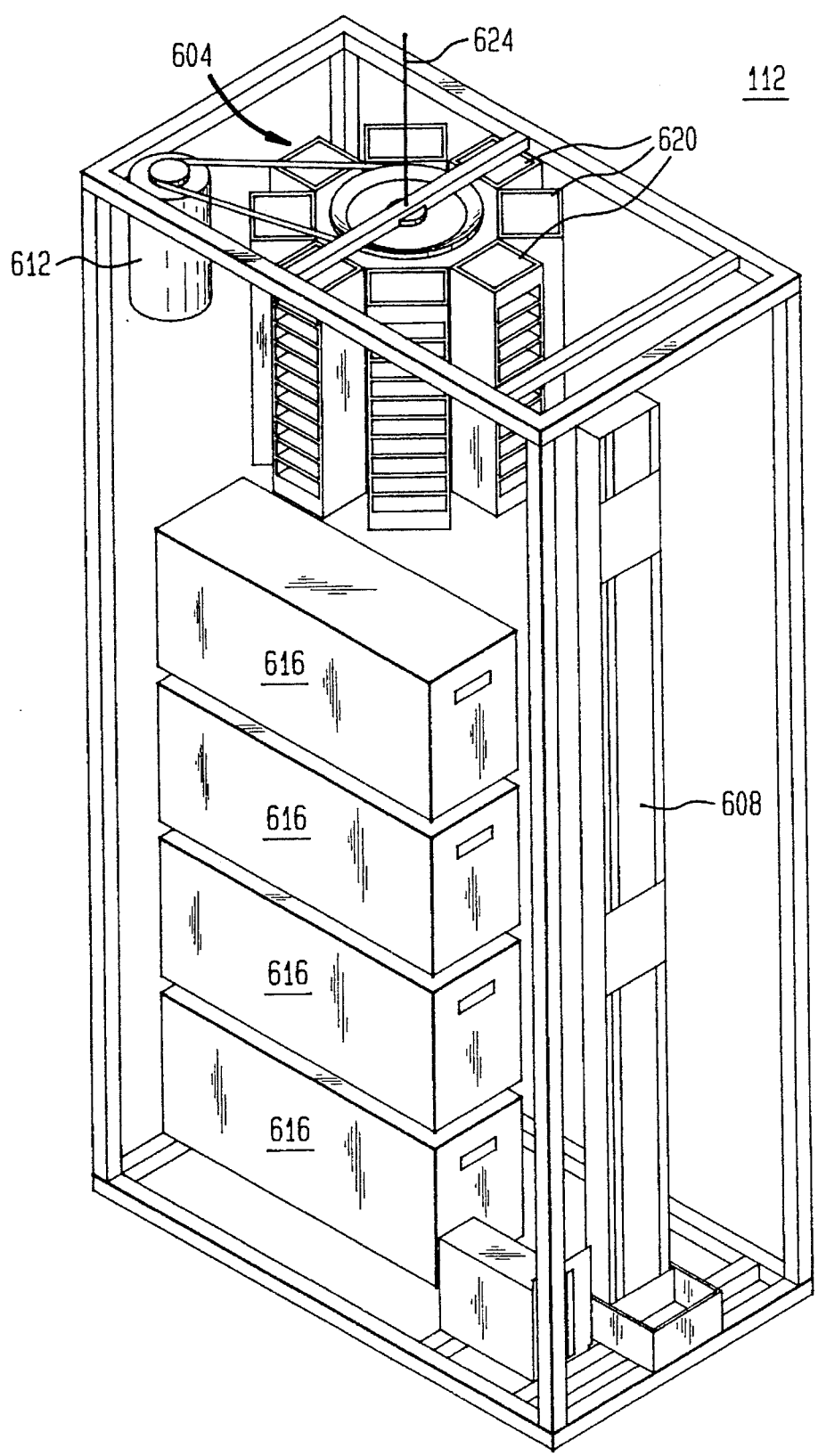
FIG. 6 is a diagram illustrating an example of media storage library 104.

FIG. 6 is a diagram illustrating a perspective view of one possible exemplary embodiment of media storage library 104. FIG. 6 illustrates media storage library 104 with the exterior panels thereof removed. This provides an illustration of the inner workings of media storage library 104. Referring now to FIG. 6, media storage library 104 includes a carousel 604, a robotic arm 608, a servo motor 612, and one or more tape drives 616. Robotic arm 608 retrieves cartridges from carousel 604 and loads them into the appropriate tape drive 616.

Carousel 604 includes a plurality of cartridge access magazines 620 arranged around a central vertical axis 624. Carousel 604 rotates about axis 624 such that each cartridge access magazine 620 can be positioned to face robotic arm 608. Thus, the cartridges in each magazine 620 can be positioned so that they can be retrieved by robotic arm 612. Servo motor 608 is used to rotate carousel 604.

Robot arm assembly 404 (specifically, robotic hand 136) accesses cartridges in carousel 604 from the side of media storage library 104 opposite the side that robotic arm 608 is on. Carousel 604 can be rotated to position one of the plurality of cartridge access magazines 620 so that robotic hand 136 can access any of the cartridges contained therein.

A further advantage of the carousel library is that rotation of carousel 604 positions a cartridge so that it can be retrieved by either robotic arm 608 of media storage library 104 or robot arm assembly 404. Thus robotic arm 608 does not have to be used to present the media to robot arm assembly 404 of media exchange system 100.

In one embodiment, one cartridge access magazine 620 can be reserved solely for cartridges borrowed from storage locations 140 or other media storage libraries 104. Alternatively, one or more storage locations in any of the cartridge access magazines 620 can be left open so that carousel 604 can accommodate additional tapes retrieved from other locations.

Communications between the control electronics of media exchange system 100 and media storage library 104 ensures that the location of each tape is updated whenever a tape is moved. This can be accomplished in numerous ways. One way is to use a common table that is shared by media storage libraries 104 and media exchange system 100 that indicates the current position of each cartridge. Alternative methods for tracking the location of tapes could easily be implemented, as would be apparent to a person skilled in the relevant art.

Although not illustrated, additional tape drives can be provided in media exchange system 100 in place of walls 162 or storage cells 140. This would provide additional tape drive capacity to computing systems interfaced to media exchange system 100. Although these tape drives would not have their own internal cache as do media storage libraries 104, these tape drives could use tapes stored in any media storage library 104 or stored in storage cells 140.

2.2 Robotic Assembly

Transport arm 132 and robotic hand 136 could be implemented using a number of different designs. An example implementation is now described. This example is further described in detail in U.S. Pat. Nos. 4,864,511 and 4,928,245, which are assigned to Storage Technology Corporation in Louisville, Colo. and which are incorporated herein by reference in their entirety.

2.2.1 Robotic Arm

Figure 3:
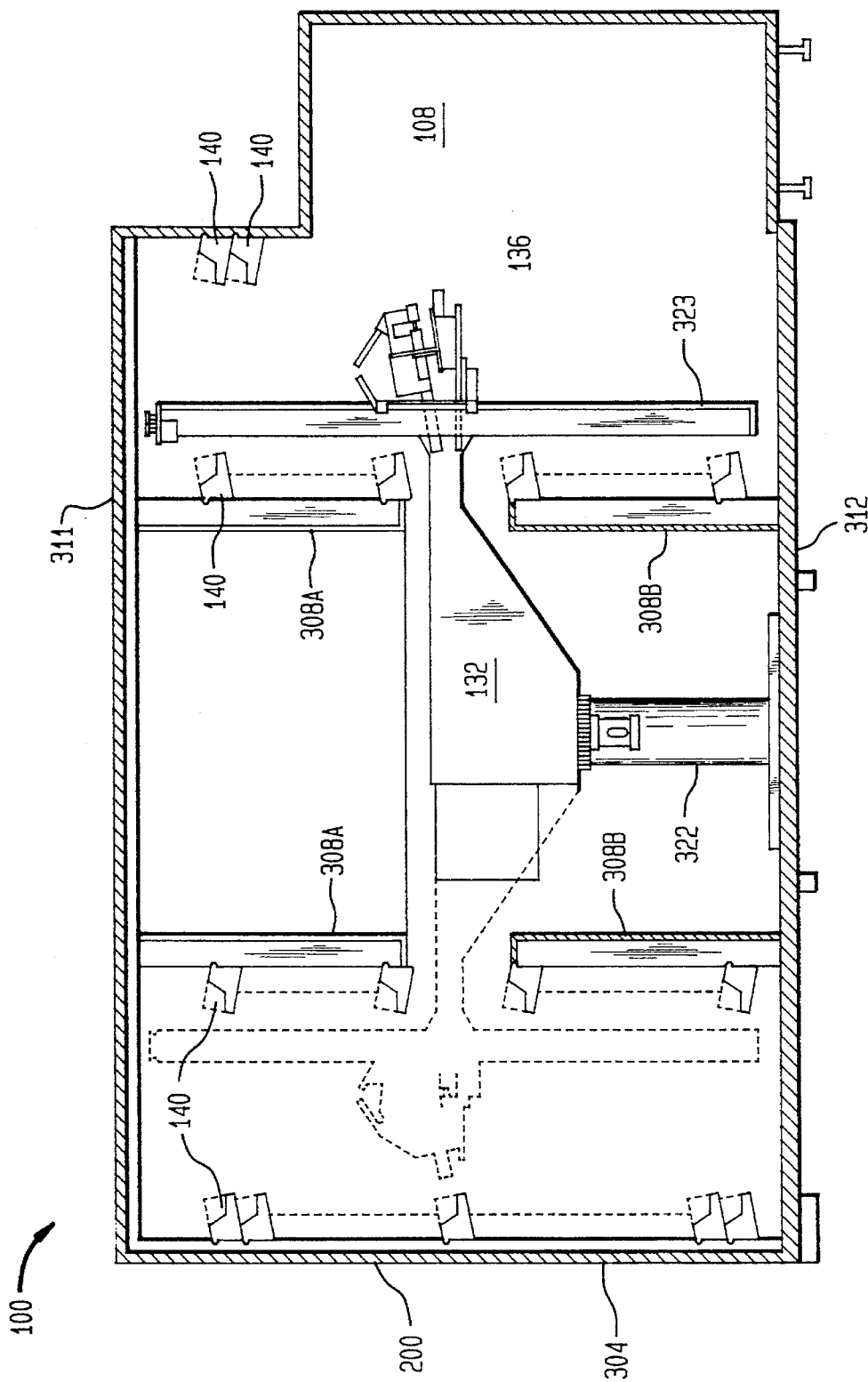
FIG. 3 is a diagram illustrating a cut away side view of the media exchange system.
Figure 4:
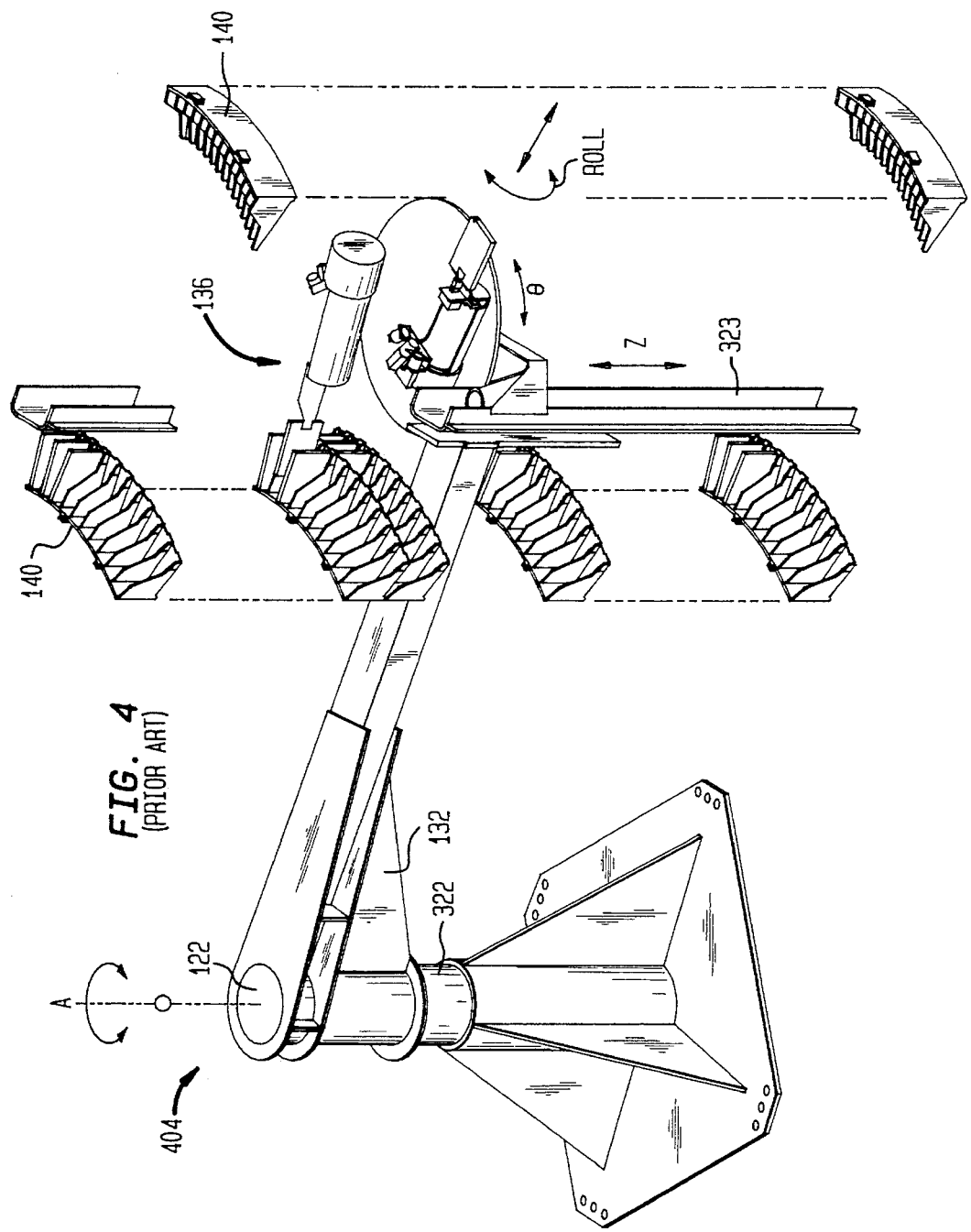
FIG. 4 is a diagram illustrating a robot arm assembly.

FIGS. 3 and 4 are a side view and a perspective view of the robot arm assembly, respectively. Referring now to FIGS. 3 and 4, a robot arm assembly 404 consists of a transport arm 132 rotatable mounted on a support column 322 which is attached to floor plates of media exchange system 100. Robot arm assembly 304 further includes a Z-mechanism 323 attached to the end of transport arm 132 and remote from support column 322. Robotic hand 136 is coupled to Z-mechanism 323. As described above, robotic hand 136 performs the cartridge retrieval and replacement functions with storage cells 140 and library storage 108.

Z-mechanism 323 provides a vertical range of motion for robotic hand 136 to access media stored at various vertical levels. Transport arm 132 rotates about central point 122 to position Z-mechanism 323 and its associated robotic hand 136. This rotation coupled with the vertical positioning provided by Z-mechanism 323 positions robotic hand 136 adjacent to the cartridge to be removed (or the slot into which the cartridge is to be placed). Rotation, roll, and reach movements of robotic hand 136 (described in Section 2.2.2) allow media at various locations adjacent to robotic hand 136 and in various orientations to be retrieved and/or replaced.

Robot arm support column 322 includes a motor (not shown) which causes transport arm 132 of the robot arm assembly 230 to rotate about central point 122. An additional motor moves robotic hand 136 along Z-mechanism 323. In this manner, robotic hand 136 can access the media stored in storage cells 140 and media storage libraries 104. Position encoders (not shown) can be included to indicate the position of transport arm 132 and Z-mechanism 323. Motors and position encoders are well known to those persons skilled in the relevant art. The motors (not shown) controlling the motion of the robot arm assembly are controlled by a media exchange system control unit 126.

Referring still to FIG. 3, media exchange system 100 generally comprises an exterior housing 304. Housing 304 actually comprises several wall segments 162. Depending on the installation, wall segments 122 are attached to a floor plate 312 and a ceiling plate 311.

Media exchange system 100 can also include an inner wall 308 on which storage cells 140 can be mounted. In one embodiment, inner wall 308 includes an upper portion 308A and a lower portion 308B. The space between upper and lower portions 308A, 308B allows transport arm 132 to pass through. Upper portion 308A and lower portion 308B support an internal cylindrical array of storage cells 140 centered about vertical axis A (which passes through center point 122).

An external cylindrical array storage cells 140 is concentrically arranged about the internal cylindrical array mounted on wall segments 162 of the exterior housing 304.

The dashed lines in FIG. 3 represent transport arm 132, Z-mechanism 323 and robotic hand 136 when transport arm 132 is rotated 180 degrees from the illustrated position. It should be noted that the robotic arm assembly 321, 322, 323 could be implemented as double ended (or greater). That is, transport arm 132 could extend in two directions from center point 122 (two directions are shown in FIG. 1). In this configuration, there would be two (or more) robotic hands 136 available to relocate cartridges. This could theoretically halve the cartridge retrieval time in some instances.

2.2.2 Robotic Hand

Figure 5:
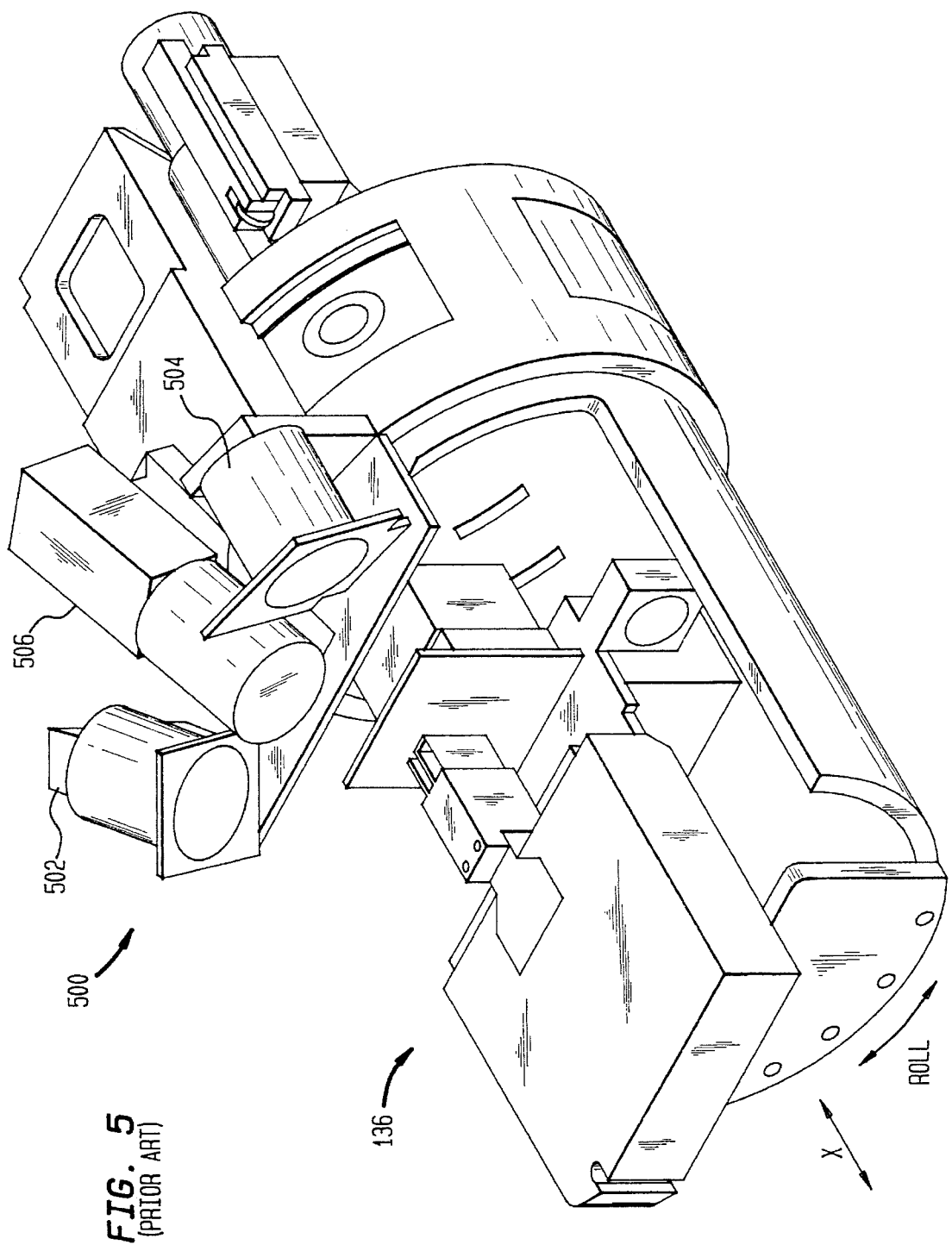
FIG. 5 is a diagram illustrating an example implementation of robotic hand 136.

FIG. 5 illustrates a representative robotic hand 136 located at the end of transport arm 132. Robotic hand 136 consists of a plurality of mechanisms that perform roll and reach functions for robot arm assembly 404. The reach function allows the hand to be extended along an axis X to retrieve or replace cartridges. The roll function allows the media to be rotated 360 degrees about axis X. Robotic hand 136 may also be rotated about the vertical axis to access inner and outer storage cells 140. This is illustrated as rotation in the θ direction in FIG. 3.

2.2.3 Vision System

A vision system 500 is located on top of the robotic hand 136 and is focused at a predetermined distance in front of the robotic hand 136. The point of focus of vision element 502 coincides with the position of a machine-readable label on the end of the cartridge stored in storage cell 140 or in media storage library 104. One or more lamps 502, 504 are provided to facilitate reading of the label. Lamps 502,504 are directed so that the light emanating therefrom crosses at a point coincident with the label.

Vision system 600 is also used to calibrate the alignment of robotic hand 136 and cartridge storage locations. A calibration system suitable for use in conjunction with the present invention is described in U.S. Pat. No. 4,908,777 to Wolfe, herein incorporated by reference in its entirety. Another suitable calibration system is described in U.S. Pat. No. 5,034,904 to Moy, herein incorporated by reference in its entirety.

It should be noted that the robotic assembly illustrated in and described with reference to FIGS. 3, 4, and 5 is presented for example only. As would be apparent to a person skilled in the relevant art, numerous robotic assembly and housing configurations could be implemented to perform the media exchange functions.

3. Representative Architectures

Numerous architectures could be implemented to effectuate control and operation of media exchange system 100. Two alternative representative architectures are described as exemplary embodiments of a control system for media exchange system 100.

Figure 7:
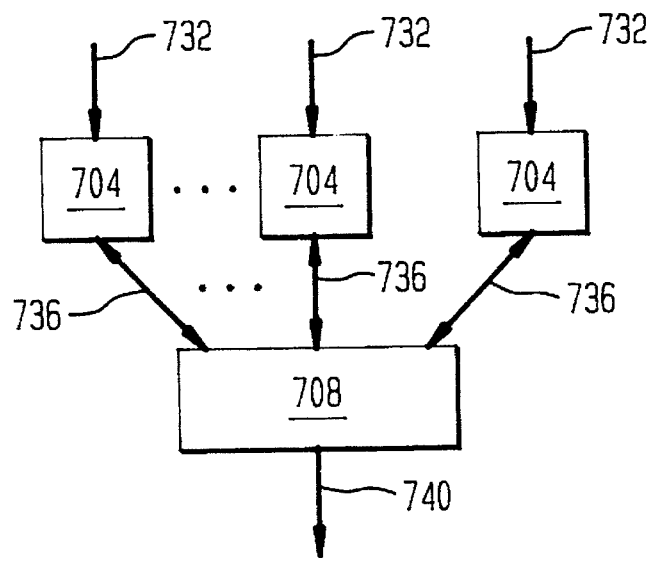
FIG. 7 is a diagram illustrating one possible representative architecture for a control system of the media exchange system.

FIG. 7 is a block diagram illustrating a representative architecture of a control system for media exchange system 100. In this representative architecture, a control system 704 is provided for each media storage library 104. Control system 704 is a dedicated control system for an individual media storage library 104. A centralized control system 708 is provided to control robot arm assembly 404 and the overall operation of media exchange system 100.

Figure 8:
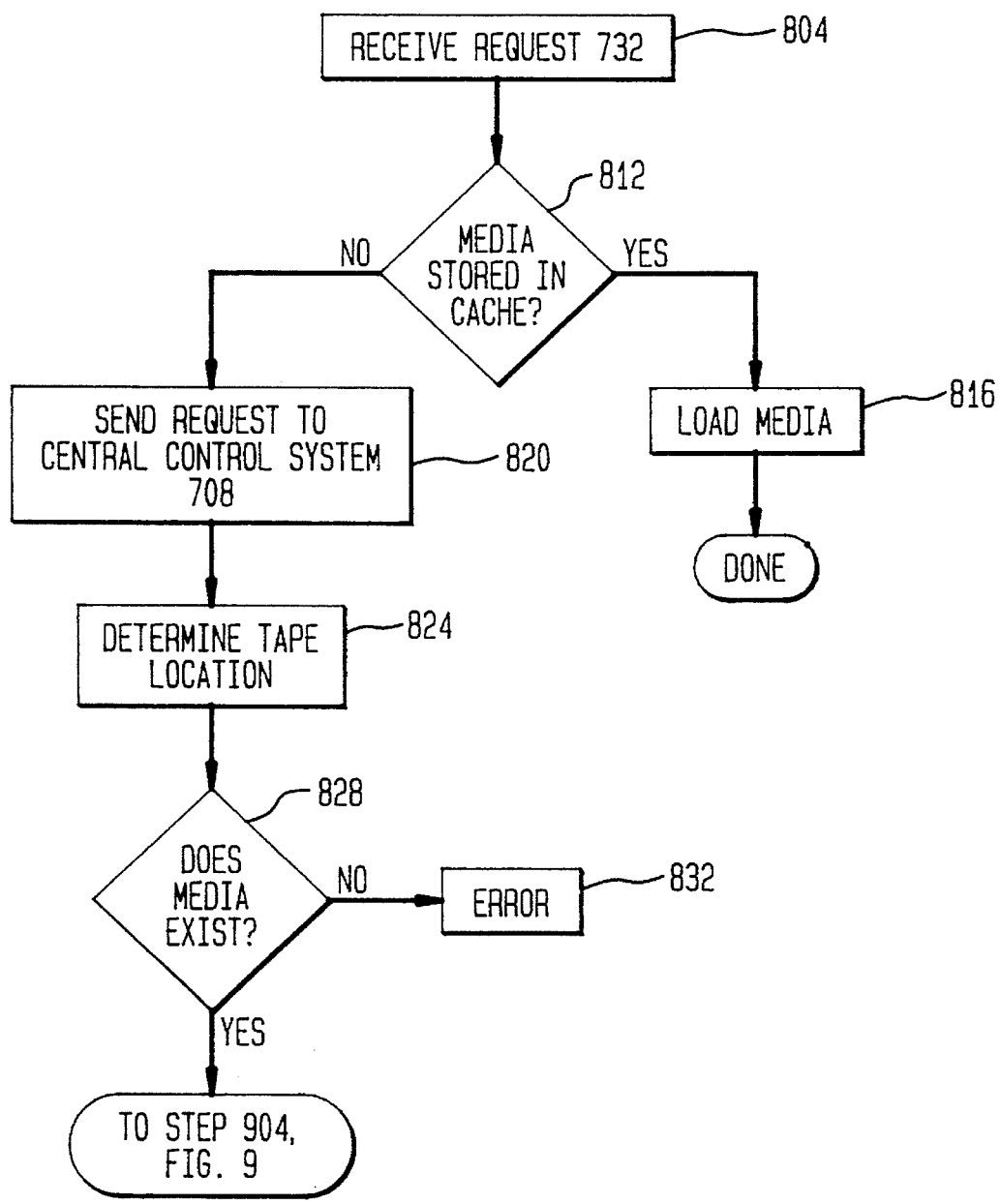
FIG. 8 is an operational flow diagram illustrating the operation of a control system for the media exchange system.
Figure 9:
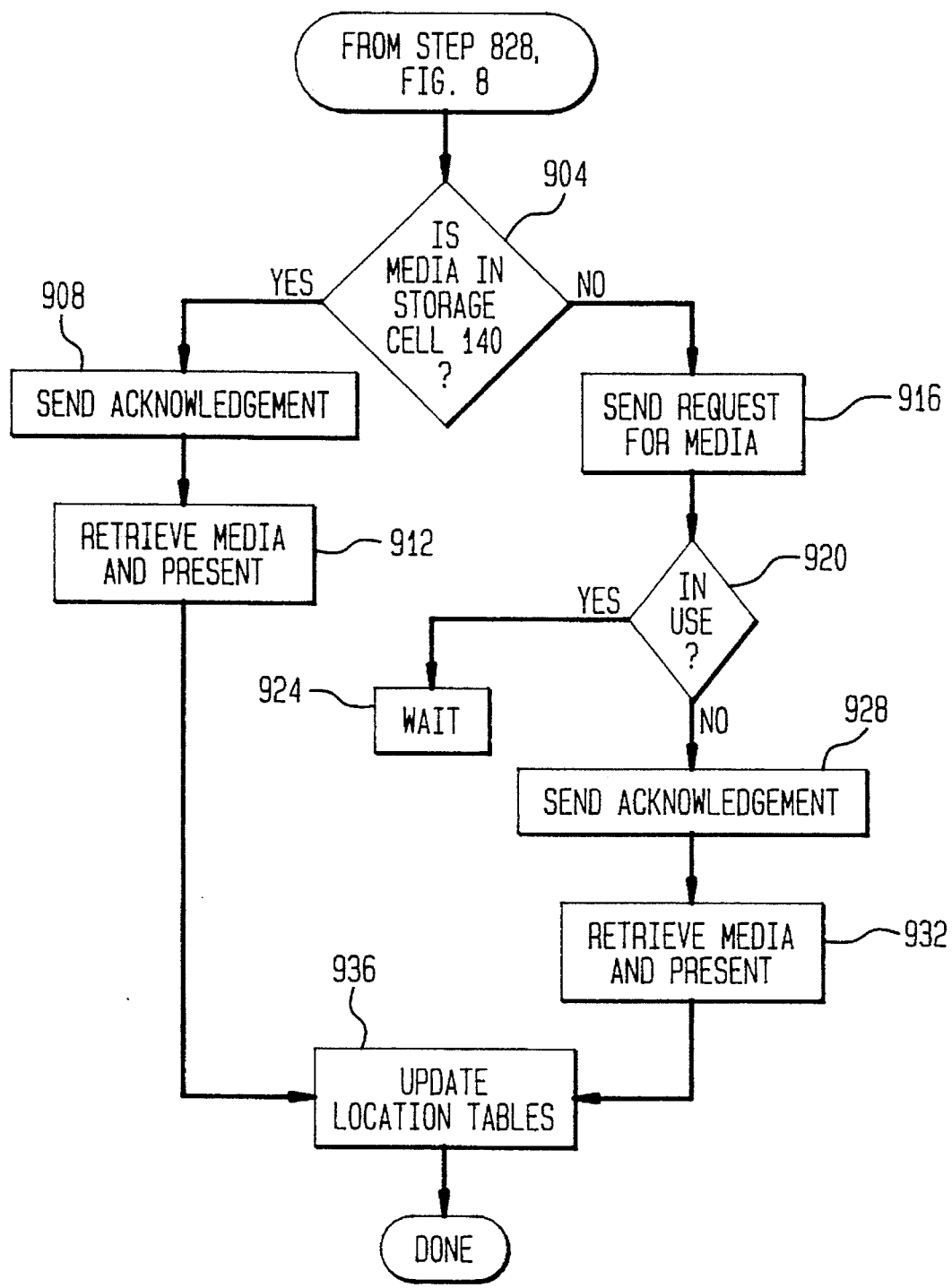
FIG. 9, which is a continuation of FIG. 8, is an operational flow diagram illustrating the operation of a control system for the media exchange system.

FIGS. 8 and 9 are an operational flow diagram illustrating the operation of this representative architecture. Referring now to FIGS. 7, 8, and 9, the operation of media exchange system 100 is now described in terms of this representative architecture. In a step 804 a control system 704 receives a request 732 from the computing system that it supports. Request 732 is a request for data stored on a particular tape cartridge.

In a step 812, the control system 704 that received request 732 checks its own cache (i.e the carousel in its media storage library 104) to determine whether it contains the cartridge having the requested data. If the cartridge is stored in that media storage library 104, control system 704 loads the the cartridge into a tape drive in that library 104. This occurs in a step 816.

If, on the other hand, the requested media is not stored in that media storage library 104, control system 704 sends a request to central control system 708 for that cartridge. This occurs in a step 820. In a step 824, central control system 708 determines the location of the media cartridge requested. The cartridge could be stored in a different media storage library 104 or in a storage cell 140. An additional possibility is that the cartridge requested does not exist in the system. If the cartridge does not exist in the system (decision block 828) an error is flagged. As the result of this error, in a step 832, central control system 708 sends an error message back to the computing system that requested the media via control system 704.

If, the media is in one of the storage cells 140 (decision block 904), an acknowledgement signal is sent from central control system 708 to control system 704 via data path 736. This acknowledge signal indicates to control system 704 that its media storage library 104 should prepare to receive the cartridge from robot arm assembly 404.

In a step 912 central control system 708 controls robot arm assembly 404 to retrieve the cartridge from the storage cell 140 in which it is stored. The cartridge is retrieved and presented to the appropriate media storage library 104. Note that the acknowledgement could be sent while robot arm assembly 404 is retrieving the cartridge. Once the cartridge is retrieved and transferred to the requesting media storage library 704, location tables indicating the current location of that cartridge are updated in a step 936.

If the media is stored in a second media storage library 104, a request to retrieve that cartridge is sent to that media storage library 104 in a step 916. If that cartridge is in use by second library 104, central control system 708 temporarily puts this request on hold in a step 924. Various handshaking and other control signals can be used to inform the computing system of the delay, and also to inform central control system 708 when the cartridge becomes available.

If the cartridge is available (or becomes available) central control system 708 sends an acknowledge signal to the control system 704 that requested the media. This occurs in a step 928. In a step 932 control system 708 directs robot arm assemble 404 to retrieve the media from the media storage library 104 in which it is stored and present it to the media storage the library 104 that requested it. Once the transfer is made, in a step 936, the location tables are updated to reflect the current location of the cartridge.

Figure 10:
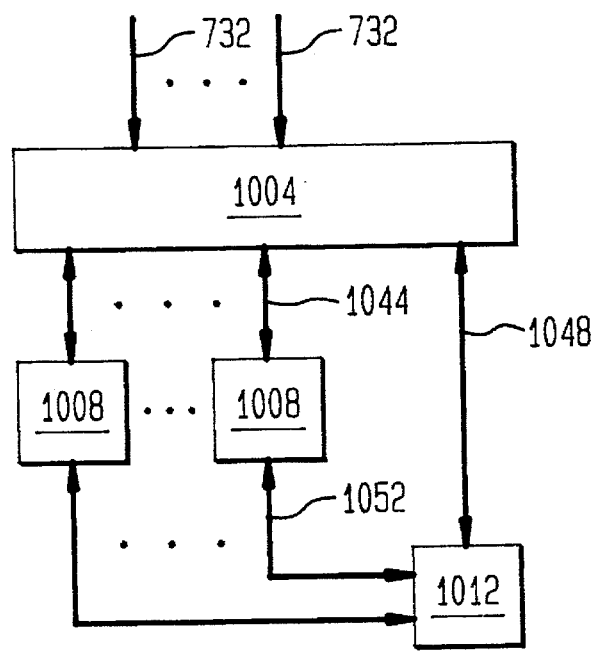
FIG. 10 is a diagram illustrating one possible representative architecture for a control system of the media exchange system.
Figure 11:
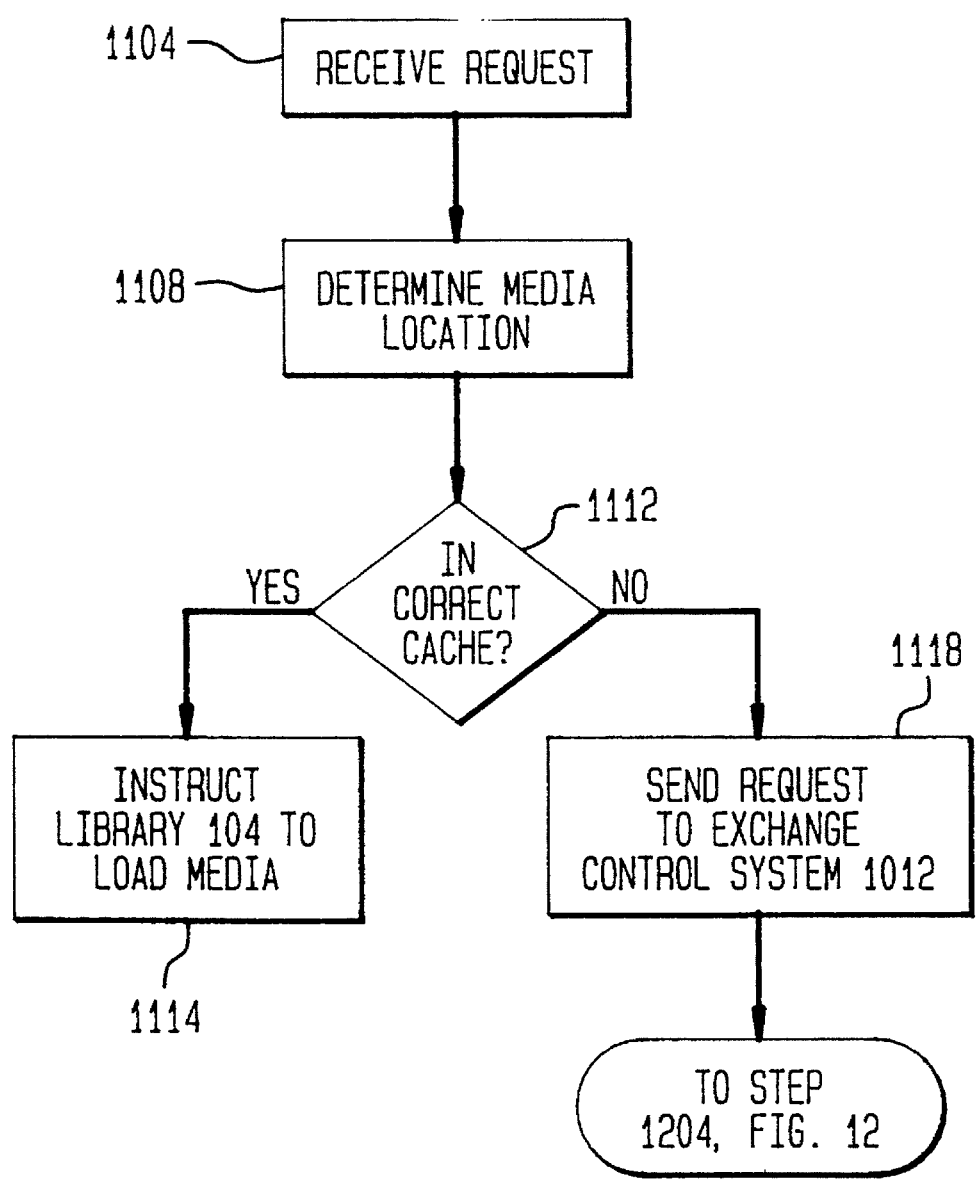
FIG. 11 is an operational flow diagram illustrating the operation of a control system for the media exchange system.
Figure 12:
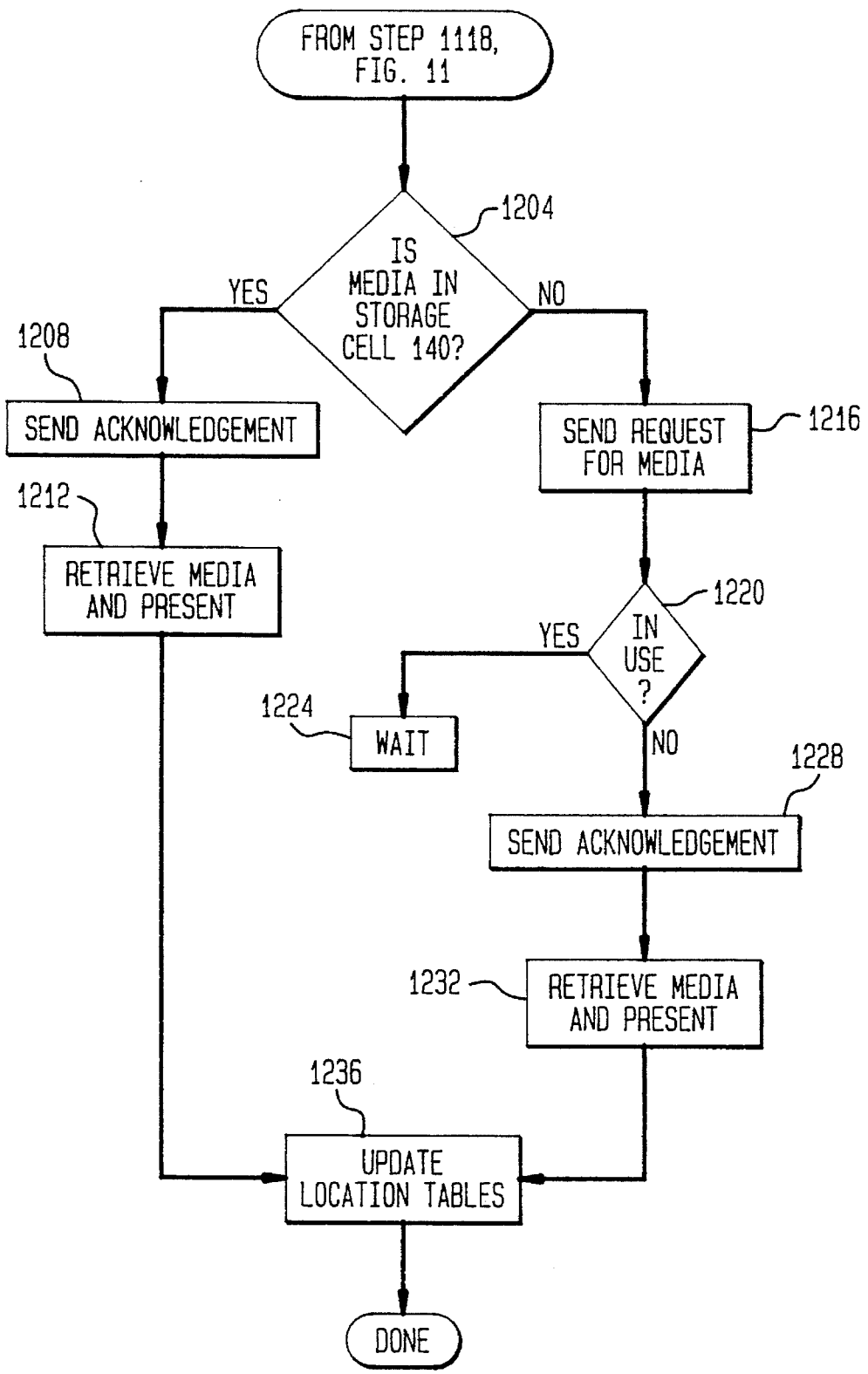
FIG. 12, which is a continuation of FIG. 11, is an operational flow diagram illustrating the operation of a control system for the media exchange system.

An alternative representative architecture is depicted in FIG. 10. Referring now to FIG. 10, a media control system 1004 is provided to interface to the computing systems and to control systems 1008 within media storage libraries 104. Each media storage library 104 has its own control system 1008. An exchange control system 1012 is also provided. The operation of this architecture is now described with reference to FIGS. 11 and 12. Referring now to FIGS. 10, 11, and 12, in a step 1104, media control system 1004 receives a request 732 from a processing system. Request 732 is a request for data stored on a particular media cartridge. Request 732 includes information regarding the identification of the requesting computing system and its associated media storage library 104 that can be accessed by the requesting computing system. This library is referred to for the purpose of this discussion as the first library 104. In a step 1108, media control system 1004 determines the location of the requested cartridge.

If the requested cartridge is in the first library 104 (decision block 1112), media control system 1004 sends an instruction via communication path 1044 to control system 1008 of the associated library instructing it to load the requested cartridge into a tape drive. If the cartridge is not in the first library, a request is sent via connection 1048 to exchange control system 1012 to locate the cartridge and retrieve it. This occurs in a step 1118.

In a step 1204, exchange control system 1012 determines the location of the requested cartridge. If the cartridge is in a storage cell 140, an acknowledgement is sent to control system 1008 of the first library 104 via data connection 1052 indicating that it should prepare to receive the cartridge. In a step 1212, exchange control system 1012 directs robot arm assembly 404 to retrieve the tape from storage cell 140 and present it to the first library 104. In a step 1236, when the cartridge is transferred, location tables are updated to reflect the new location of the cartridge.

If, in step 1204, it is determined that the cartridge is stored in a second media storage library 104, exchange control system 1012 sends a request to the control system 1008 of the second library 104 for the cartridge. This request, sent in a step 1216, is sent via data connection 1052. If the cartridge is in use by the second library 104 (decision block 1220) the request is temporarily put on hold until the cartridge can be made available. This occurs in a step 1224. If the cartridge is available, exchange control system 1012 notifies control system 1008 of the first library 104 that it is retrieving the tape. This notification is sent in a step 1228.

In a step 1232, exchange control system 1012 directs robot arm assembly 404 to retrieve the media from the library 104 where it is stored and present it to the associated library 104. In a step 1236, the location table are updated to reflect the current location of the cartridge.

Although mentioned above, this scenario is also capable of finding an error if the requested cartridge does not exist within storage cells 140 or any of the media storage libraries 104.

These two representative architectures, and the control scenarios described therewith, are presented by way of example only. It would be apparent to a person skilled in the relevant art how alternative architectures and control scenarios could be implemented to achieve the functionality desired by media exchange system 100. Additionally, changes to the architecture and/or control system could be made depending on the specific application of media exchange system 100. The selection of an architecture and associated control algorithms can be made to suit the particular interface between media storage libraries 104 and the computing systems that interface thereto.

4. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A media exchange system, comprising:

a housing defining an interior data storage area having a plurality of first storage cells within said interior storage area, each of said first storage cells for storing a data storage cartridge;

a plurality of media storage library units having an opening in said housing, each of said plurality of media storage library units including, a data storage cache within said each of said plurality of media storage library units proximate to said opening, said data storage cache having a plurality of second storage cells, each of said plurality of second storage cells for storing a data storage cartridge, one or more tape drive systems within each of said media storage library units, a tape transfer system within said each of said plurality of media storage library units, for transferring said data storage cartridges between said one or more tape drive systems and said data storage cache, and an internal control system for controlling said data storage cache, said one or more tape drive systems and said tape transfer system;

robot means within said interior data storage area, for transferring one or more data storage cartridges from one of said first and second storage cells to another of said first and second storage cells, said robot means accessing said second storage cells through said opening; and control means for controlling said robot means and for communicating with said internal control system of said plurality of media storage library units, whereby all of said plurality of media storage library units have access to data stored in any other of said plurality of media storage library units in the media exchange system.

2. The media exchange system of claim 1, wherein said data storage cache is a carousel, said carousel rotating about an axis to provide a requested data storage cartridge to said tape transfer system and to said robot means.

3. The media exchange system of claim 1, wherein said robot means has a plurality of hands.

4. The media exchange system of claim 1, wherein said tape transfer system comprises a robotics system.

5. The media exchange system of claim 1, further comprising one or more independent tape drive systems, wherein said robot means is further for transferring said data storage cartridges between said first and second storage cells and said one or more independent tape drive systems.

6. The media exchange system of claim 1, wherein said control means comprises a centralized control system for determining a location of a requested data storage cartridge requested by a requesting one of said one or more tape drive systems, and further for operating in conjunction with one or more of said internal control systems to control the transfer of said requested data storage cartridge from said location to said requesting one of said one or more tape drive systems.

7. In a media exchange system including a housing defining an interior data storage area having a plurality of first storage cells within said interior storage area, each of the first storage cells for storing a data storage cartridge, a plurality of media storage library units having an opening in the housing, each of the plurality of media storage library units including a data storage cache having a plurality of second data storage cartridge storage cells, one or more tape drive systems, and a tape transfer system for transferring the data storage cartridges between the one or more tape drive systems and the data storage cache under the control of an internal control system, and further including a robot means for transferring data storage cartridges between said storage cells, and a control means for controlling said robot means, a method for transferring data storage cartridges comprising the steps of:

(a) receiving, by the internal control system of a first media storage library unit, a request for data stored on a requested data storage cartridge, said request is generated by a computing system coupled to said first media storage library unit;

(b) determining, by the internal control system of said first media storage library unit, whether said requested data storage cartridge is stored in the data storage cache of the first media storage library unit;

(c) when said requested data cartridge is stored in said data storage cache of said first media storage library unit, transferring, by the tape transfer system of said first media storage library unit, said requested data storage cartridge from said data storage cache to a tape drive system within said first media storage library unit;

(d) transferring, by said internal control system, a request to locate said requested data storage cartridge to a central control system when said requested data storage cartridge is not located in said data storage cache of said first media storage library unit;

(e) determining, by said central control system, said location of said requested data storage cartridge;

(f) transferring, by the robot means, said requested data storage cartridge from a second media storage library unit to said first media storage library unit when said requested data storage cartridge resides in said second media storage library unit;

(g) transferring, by the robot means, said requested data storage cartridge from the interior storage area to said first media storage library unit when said requested data storage cartridge resides in the interior data storage area of the housing; and (h) updating, by said central control system, location tables indicating a current location of said requested data storage cartridge.

8. The method of claim 7, further comprising the step of:

(i) generating an error signal, by said central control system, when said requested data storage cartridge does not reside in the media exchange system.

* * * * *